(12) United States Patent
Wagner

(10) Patent No.: US 12,225,915 B2
(45) Date of Patent: Feb. 18, 2025

(54) SYSTEM AND METHOD FOR MIXING OF PRODUCT

(71) Applicant: Superior Ice Cream Equipment, LLC, Northvale, NJ (US)

(72) Inventor: Christoph J. Wagner, Cheltenham, PA (US)

(73) Assignee: Superior Ice Cream Equipment, LLC, Northvale, NJ (US)

( * ) Notice: Subject to any disclaimer, the term of this patent is extended or adjusted under 35 U.S.C. 154(b) by 530 days.

(21) Appl. No.: 17/532,499

(22) Filed: Nov. 22, 2021

(65) Prior Publication Data
US 2022/0079184 A1    Mar. 17, 2022

Related U.S. Application Data

(63) Continuation-in-part of application No. PCT/US2019/033537, filed on May 22, 2019.

(51) Int. Cl.
| | |
|---|---|
| *A23G 9/22* | (2006.01) |
| *B01F 27/112* | (2022.01) |
| *B01F 27/116* | (2022.01) |
| *B01F 101/13* | (2022.01) |

(52) U.S. Cl.
CPC ............ *A23G 9/224* (2013.01); *B01F 27/112* (2022.01); *B01F 27/1161* (2022.01); *B01F 2101/13* (2022.01)

(58) Field of Classification Search
CPC . A23G 9/16; A23G 9/20; A23G 9/222; A23G 9/224; B01F 2101/13; B01F 27/112; B01F 27/1161; A23D 9/02
See application file for complete search history.

(56) References Cited

U.S. PATENT DOCUMENTS

| | | | | |
|---|---|---|---|---|
| 1,564,253 A | * | 12/1925 | Larsen .................. | A23G 9/163 366/296 |
| 1,880,731 A | * | 10/1932 | Boileau ................. | A23G 9/163 366/288 |
| 2,056,431 A | * | 10/1936 | Light ..................... | A23G 9/20 366/222 |
| 2,281,944 A | * | 5/1942 | Miller .................... | A23G 3/04 366/312 |

(Continued)

FOREIGN PATENT DOCUMENTS

WO    WO-2016038098 A1 *    3/2016    ........... A23G 1/0006

OTHER PUBLICATIONS

International Search Report including the Written Opinion from Application No. PCT/US19/33537 mailed Aug. 9, 2019, pp. 1-8.

*Primary Examiner* — Kun Kai Ma
(74) *Attorney, Agent, or Firm* — Lerner David LLP

(57) ABSTRACT

In one embodiment, the present disclosure includes a device for manufacturing a frozen edible product, including a cylindrical tank and a dasher disposed within the cylindrical tank and configured to rotate in a direction of rotation on an axis of rotation. A non-circular cylindrical core extends within the core along the axis of rotation. The dasher includes a generally cylindrical frame concentric with the tank and having a plurality of gaps, deflectors extending radially inward relative to the axis of rotation and circumferentially in the direction of rotation from the gaps, and blades extending radially outward from the dasher.

20 Claims, 10 Drawing Sheets

(56) References Cited

U.S. PATENT DOCUMENTS

| | | | | | |
|---|---|---|---|---|---|
| 2,284,907 | A | * | 6/1942 | Kinzey | A23G 9/12 |
| | | | | | 62/342 |
| 2,309,424 | A | * | 1/1943 | Weinreich | A23G 9/224 |
| | | | | | 366/246 |
| 2,538,716 | A | * | 1/1951 | Wakeman | A23G 9/16 |
| | | | | | 62/342 |
| 2,735,276 | A | * | 2/1956 | Thompson, Jr. | A23G 9/224 |
| | | | | | 366/296 |
| 2,746,730 | A | * | 5/1956 | Swenson | B01F 27/1142 |
| | | | | | 62/343 |
| 2,867,994 | A | * | 1/1959 | Wakeman | A23G 9/224 |
| | | | | | 62/343 |
| 3,145,017 | A | * | 8/1964 | Thomas | F28F 19/008 |
| | | | | | 62/343 |
| 4,068,832 | A | * | 1/1978 | Blaetz | A23G 3/0221 |
| | | | | | 99/452 |
| 4,129,389 | A | * | 12/1978 | Wakeman | A23G 9/224 |
| | | | | | 366/144 |
| 4,162,127 | A | * | 7/1979 | Wakeman | A23G 9/20 |
| | | | | | 62/343 |
| 4,176,970 | A | * | 12/1979 | Blaetz | A23G 3/14 |
| | | | | | 366/280 |
| 5,312,184 | A | * | 5/1994 | Cocchi | A23G 9/224 |
| | | | | | 62/343 |
| 5,419,150 | A | * | 5/1995 | Kaiser | A23G 9/22 |
| | | | | | 62/342 |
| 5,644,926 | A | * | 7/1997 | Kress | A23G 9/228 |
| | | | | | 15/236.1 |
| 6,490,872 | B1 | * | 12/2002 | Beck | A23G 9/228 |
| | | | | | 62/342 |
| 6,494,055 | B1 | * | 12/2002 | Meserole | A23G 9/30 |
| | | | | | 366/310 |
| 2014/0139053 | A1 | * | 5/2014 | Effler | H02K 3/30 |
| | | | | | 310/158 |

* cited by examiner

SYSTEM AND METHOD FOR MIXING OF PRODUCT

CROSS-REFERENCE TO RELATED APPLICATIONS

The present application is a continuation-in-part under 35 U.S.C. § 111(a) of International Application No. PCT/US2019/033537, filed May 22, 2019, the disclosure of which is incorporated herein by reference.

BACKGROUND

Known mixing apparatuses include a generally cylindrical freezing tank, also referred to in the industry as a tube or a cylinder, and a dasher disposed within the freezing tank to accomplish mixing. The dasher is rotated continuously, and has knives that scrape an interior surface of the tank to drive mixture at a radially outer part of the tank inward. The dasher also includes features to pump the mixture present at a radially inner part of the tank outward towards the interior surface of the tank. Such features are commonly a pump tube, also known as a core, which extends parallel to the tank but is eccentric to the dasher's axis of rotation. In other words, the core is off-center to the axis of the rotation such that as the dasher rotates, the motion of the mixture within the tank is asymmetric within the volume of the tank. The knives and pump tube cooperate to effect continuous agitation of the mixture within most regions of the tank.

However, this eccentric motion of the mixture within the tank of such existing systems is inefficient and causes excessive wear on the manufacturing system, requiring constant maintenance and large amounts of energy to operate. There is a need in the art for a more reliable and efficient dasher design, which is capable of making products of desirable textures and consistencies, while minimizing the wear and tear and energy demands of current designs.

BRIEF SUMMARY OF THE INVENTION

In one embodiment, the present disclosure includes a device for manufacturing a frozen edible product, including a cylindrical tank; and a dasher disposed within the cylindrical tank and configured to rotate in a direction of rotation on an axis of rotation, the dasher having: a generally cylindrical frame concentric with the tank and having a plurality of first gaps; deflectors extending from the first gaps, each deflector extending radially inward relative to the axis of rotation and circumferentially in the direction of rotation; and blades extending radially outward from the dasher.

In another embodiment, the present disclosure includes a device for manufacturing a frozen edible product, including a cylindrical tank and a dasher disposed within the cylindrical tank and configured to rotate in a direction of rotation on an axis of rotation, the dasher having a generally cylindrical frame concentric with the tank and having a plurality of first gaps, and one or more deflectors extending from the first gaps, each deflector extending radially inward relative to the axis of rotation and circumferentially in the direction of rotation. The dasher of this embodiment may also include a non-circular cylindrical core disposed concentrically within the frame, and a cavity can be defined between a radially inner surface of the frame and a radially outer surface of the core. This cavity may be generally annular in shape, with an outer perimeter corresponding to the radially inner surface of the frame (e.g., a circular cylindrical shape) and an inner perimeter correspondence to the radially outer surface of the core (e.g., a non-circular cylindrical shape). The core may be football or lemon-shaped, oblong, obround, or oval shaped, polygonal shaped (e.g., triangular, diamond, pentagonal, hexagonal, etc.), star-shaped, a randomized geometrical shape, or the like, in axial cross-section along most or all of its length. The cross-sectional shape of the core may also vary along its length between one or more of these shapes, or even between one or more of these shapes and a circular cylindrical shape. The dasher may also include one or more blades extending radially outward from the dasher.

Further, the deflectors can be arranged in axially extending rows of deflectors and/or the blades can be arranged in axially extending rows of blades. Additionally, the rows of deflectors and rows of blades can be arranged in an alternating pattern around a circumference of the dasher. Moreover, the alternating pattern may be symmetrical such that the dasher has a balanced distribution of mass relative to the axis of rotation. The dasher can also include a plurality of second gaps such that the blades (if present) extend in the direction of rotation at least partially overlapping the second gaps. As such, the deflectors can extend radially inward into the cavity. If all present, the cylindrical tank, the cylindrical frame, the core and the cavity of the dasher may all be arranged concentrically around the axis of rotation.

In yet another embodiment, the present disclosure includes a dasher assembly for manufacturing a frozen edible product, including a generally cylindrical frame extending along the axis of rotation, the frame including a plurality of first gaps in the frame and a plurality of deflectors, wherein each deflector extends radially inward and circumferentially in the direction of rotation from a respective first gap in the frame into the cavity. This cavity may be generally annular in shape, with an outer perimeter corresponding to the radially inner surface of the frame (e.g., a circular cylindrical shape) and an inner perimeter correspondence to the radially outer surface of the core (e.g., a non-circular cylindrical shape). The core may be football or lemon-shaped, oblong, obround, or oval shaped, polygonal shaped (e.g., triangular, diamond, pentagonal, hexagonal, etc.), star-shaped, a randomized geometrical shape, or the like, in axial cross-section along most or all of its length. The cross-sectional shape of the core may also vary along its length between one or more of these shapes, or even between one or more of these shapes and a circular cylindrical shape. The dasher of this embodiment can also include one or more blades extending radially outward from the frame, such that the deflectors are arranged in axially extending rows of deflectors and/or the blades are arranged in axially extending rows of blades. Additionally, the rows of deflectors and rows of blades may be arranged in an alternating pattern around a circumference of the dasher. Further, the frame and the core can have a constant, continuous circumferential shape around the axis and are co-axial with the axis.

In yet a further embodiment, the present disclosure includes a method for manufacturing a frozen dairy product, including filling a device for manufacturing the frozen dairy product with an amount of dairy product mixture, the device comprising a cylindrical tank and a dasher positioned within the cylindrical tank and configured to rotate in a direction of rotation on an axis of rotation, the dasher comprising a generally cylindrical frame concentric with the tank and having a plurality of first gaps, and deflectors extending from the first gaps, each deflector extending radially inward relative to the axis of rotation and circumferentially in the direction of rotation, and rotating the dasher in the direction of rotation on the axis of rotation. Further, the dasher can also include a plurality of blades and a plurality of second gaps, whereby each blade may extend radially outward from the frame and at least partially overlapping a respective second gap, wherein during the rotating step the blades may direct a mixture into the frame through the second gaps, and the deflectors may direct the mixture out of the frame through the first gaps. Additionally, the device may include a non-circular cylindrical core disposed concentrically within the frame, such that a cavity may be defined between a radially inner surface of the frame and a radially outer surface of the core, wherein during the rotating step the blades may direct a mixture into the cavity, and the deflectors may direct the mixture out of the cavity. The core may be football or lemon-shaped, oblong, obround, or oval shaped, polygonal shaped (e.g., triangular, diamond, pentagonal, hexagonal, etc.), star-shaped, a randomized geometrical shape, or the like, in axial cross-section along most or all of its length. The cross-sectional shape of the core may also vary along its length between one or more of these shapes, or even between one or more of these shapes and a circular cylindrical shape.

This method may further include the step of preparing the dairy product mixture prior to the filling step, wherein the filling step includes introducing the prepared dairy product mixture. Further, an amount of compressed gas may be introduced to the dairy product mixture prior to the filling step, wherein the filling step includes introducing the prepared dairy product mixture and compressed gas simultaneously. Additionally, the dairy product mixture can include at least a dairy component and optionally a flavor component, wherein the filling step may include independently adding to the device the dairy component, the optional flavor component, and compressed gas, wherein the rotating step may include mixing the dairy component, optional flavor component, and compressed gas to create the dairy product mixture. The rotating step of this embodiment may continue until the dairy product mixture is mixed and cooled into a semi-frozen dairy product, and the method may further include the step of moving the semi-frozen dairy product from the device into a freezer to further cool the dairy product and form the frozen dairy product.

DETAILED DESCRIPTION

FIGS. 1-5 illustrate one embodiment of a mixing apparatus 10, including a cylindrical or generally cylindrical freezing tank 11 extending along an axis X. A radial direction R is defined perpendicular to the axis X. An elongate dasher 12 is disposed concentrically within the tank 11 along the axis X. As tank 11 and dasher 12 are positioned concentrically, the axis X is also an axis of rotation for the dasher 12.

Figure 1:
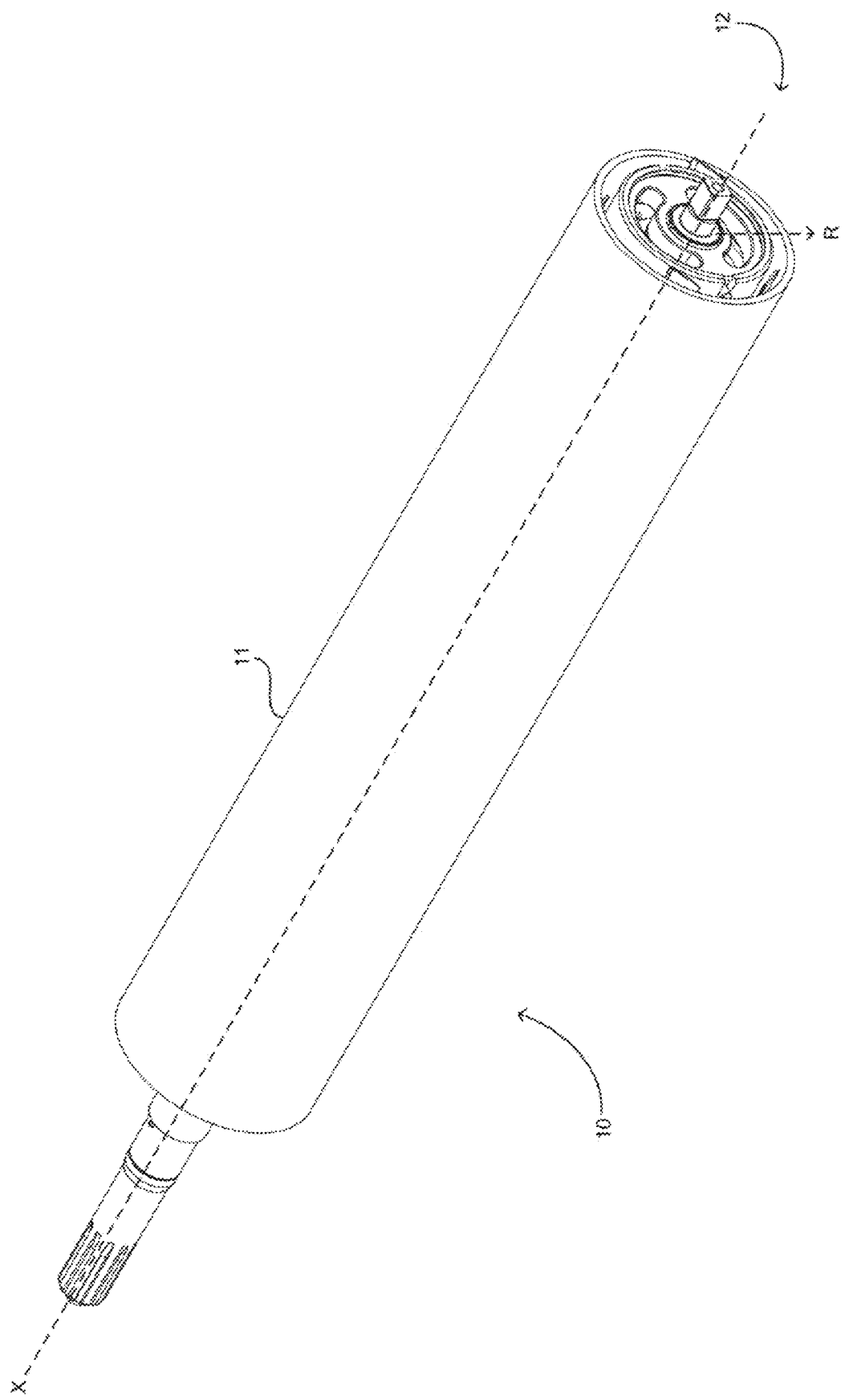
FIG. 1 is a perspective view of a mixing apparatus according to an embodiment of the present disclosure.
Figure 2:
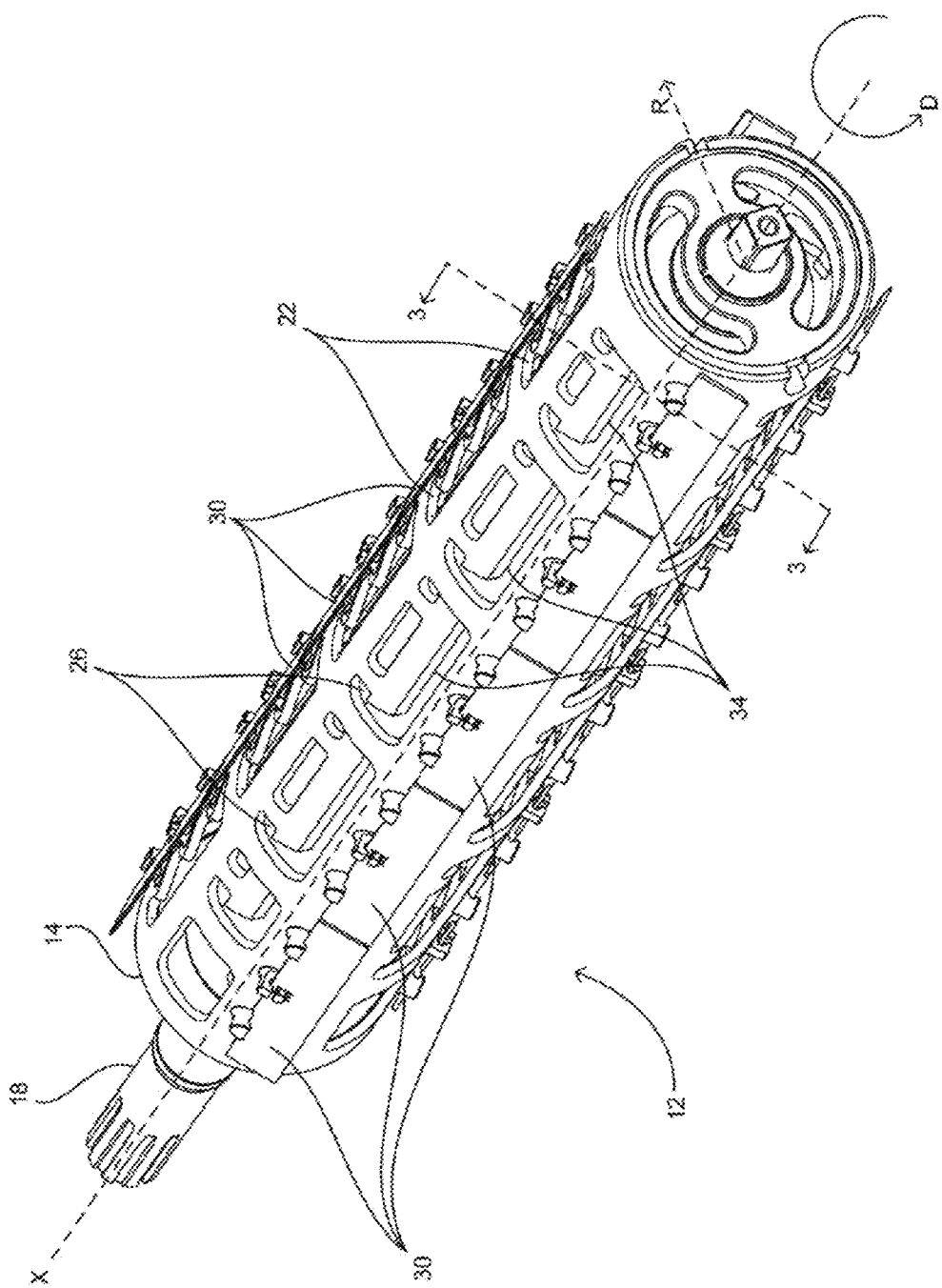
FIG. 2 is a perspective view of a dasher in the mixing apparatus.

FIG. 2 illustrates the dasher 12 in greater detail. The dasher 12 has a cylindrical or generally cylindrical frame 14 that extends along the axis X. A drive shaft 18 operatively connected to the frame 14 serves to enable the dasher to be driven by, for example, a motor in a direction of rotation D.

The frame 14 according to the illustrated embodiment includes circumferentially alternating rows of first gaps 22 and second gaps 26 that extend axially along the frame. According to the illustrated embodiment, the first gaps 22 are entry gaps and the second gaps 26 are exit gaps for agitated mixture. Mixture herein will be used to refer generally to any materials processed by the mixing apparatus 10. Ingredients for a frozen edible product such as ice cream will be described as an exemplary mixture throughout, but the contents of the present disclosure can be advantageously applied to a variety of substances and products, some of which are described below. The mixture may be one or more substances in any state of matter. Mixtures of solids, liquids, and gases are explicitly contemplated. Further, the mixture could be other than ingredients for a food product. Cosmetic and medical products are contemplated, as well as media for heat exchange. Generally speaking, the dasher of the present disclosure can be used with any mixture to make any product where manufacturing of the product may benefit from heat exchange and the introduction of gas into the mixture to result in a desirable texture and consistency. While any mixtures for which the dasher 12 may be beneficial are contemplated, many of the examples provided herein will be directed towards food products, namely frozen dairy products such as ice cream and other frozen confections.

Additionally, while any gas is envisioned to be used with the system including the dasher, to incorporate the gas into the mixture, typically compressed air, nitrogen or carbon dioxide are used. Further, such gas introduced into the tank is usually pressurized, or compressed, as the contents of the tank are typically under pressure. However, it is envisioned that there may be uses in which the gas need not be compressed into order to be introduced into the tank.

Knives 30 extend radially outward from the frame 14 and circumferentially in the direction of rotation D to interact with first gaps 22. As illustrated, the knives 30 may at least partially overlap the first gaps 22. Similarly, deflectors 34 extend radially inward from the frame 14 and circumferentially in the direction of rotation D to interact with second gaps 26. As illustrated, the deflectors 34 may at least partially overlap the second gaps 26. The knives 30 and deflectors 34 are arranged in circumferentially alternating rows in the illustrated embodiment, but other embodiments with differing arrangements are contemplated. For example, embodiments wherein the knives 30 and deflectors 34 alternate axially within a row, or wherein both a knife 30 and a deflector 34 extend over a single gap 22 and/or 26 are contemplated.

According to some embodiments, the deflectors 34 are of a unitary piece with the frame 14. Manufacturing a dasher 12 according to such embodiments may include, for example, producing a cylinder corresponding to the frame 14 and cutting openings in the cylinder, wherein each of the openings provides one of the second gaps 26 and a blank for one of the deflectors 34. Each resulting blank is then pressed or drawn radially inward to produce the deflectors 34 as illustrated. Such a manufacturing method enables the frame 14 and deflectors 34 to be manufactured from a single piece of material (e.g., as a monolithic structure) which may provide various benefits such as increased strength, since the entire structure is a single piece there are no connections between pieces which could flex or cause movement, and reliability, in that the lack of connections between pieces minimizes weak points which could break.

Figure 3:
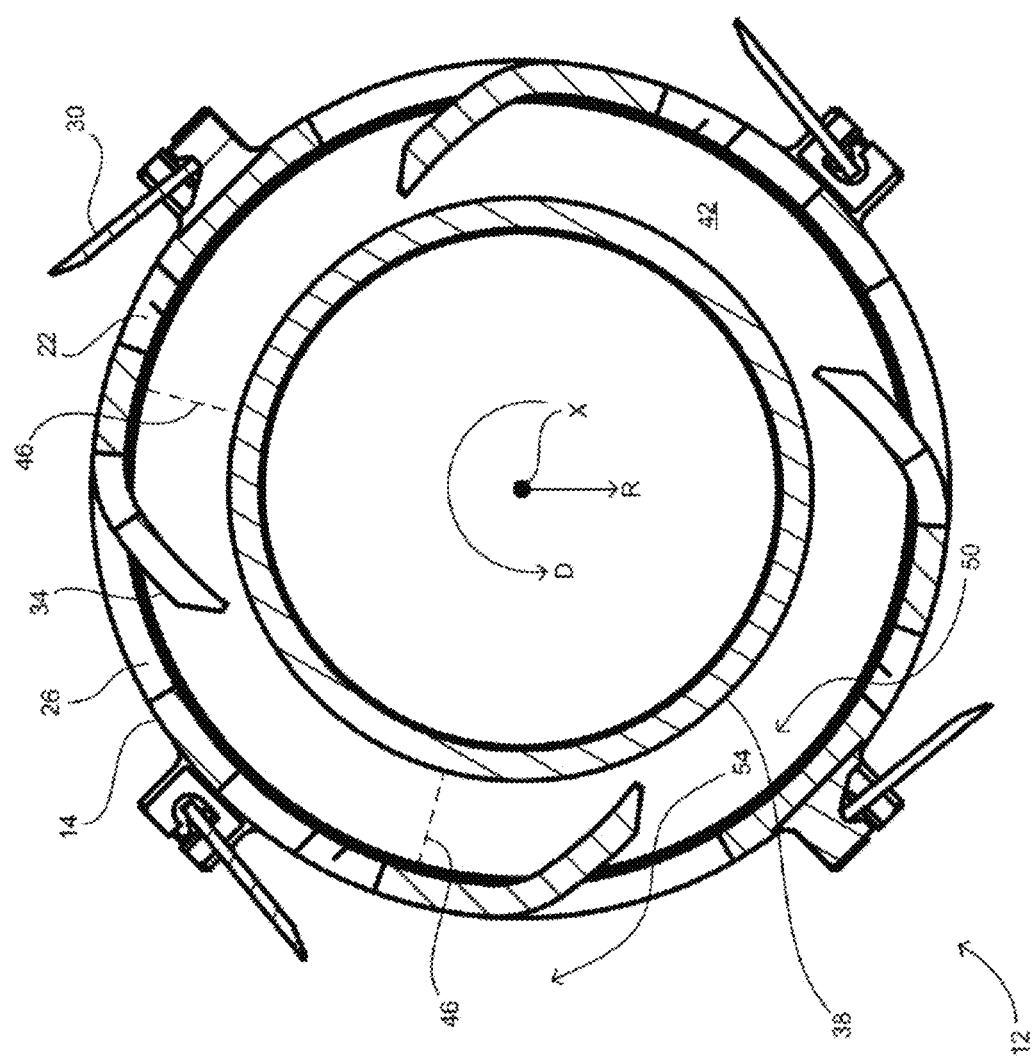
FIG. 3 is a view along section 3-3 of FIG. 2.

The relationship of these features relating to this particular embodiment are further illustrated in FIG. 3, which illustrates the dasher 12 and a cylindrical or generally cylindrical core 38 disposed along the axis X concentrically within the frame 14. A cavity 42 is thus defined between a radially inner surface of the frame 14 and a radially outer surface of the core 38 generally or exactly in the shape of a circular hollow cylinder. Stated another way, a radial distance or spacing 46 between the radially inner surface of the frame 14 and the radially outer surface of the core 38 is uniform or generally uniform around the circumference of the dasher 12 along a majority or entirety of a length of the dasher 12. As such, the dasher 12 according to the illustrated embodiment has a balanced distribution of mass relative to the axis X of rotation. According to various embodiments, the dasher 12 has a balanced distribution of mass relative to the axis X along the majority or the entirety of the length of the dasher 12. Similarly, though tank 11 is not shown in this FIG. 3, cavity 42, core 38 and frame 14, all of which being co-axial and concentric (or generally co-axial and concentric) with one another, are also co-axial and concentric (or generally co-axial and concentric) with tank 11 and a secondary cavity 43 defined between the outer surface of frame 14 and the inner surface of tank 11.

According to the illustrated embodiment, the core 38 does not rotate with the dasher 12. Instead, the core 38 is rotationally fixed relative to the tank 11. The mixing device 10 of the illustrated embodiment therefore has relatively few wear parts and, as a result, is likely to require less maintenance than some known devices. According to some embodiments, the core 38 is used as a channel for a hot or cold medium to allow for heat exchange with contents of the tank 11. In various examples, a cold medium in the core 38 could be used to cool, semi-freeze, or freeze contents of the tank, a hot medium could be used to warm or even roast contents of the tank, or the medium could be a working fluid in a heating or refrigerating cycle. According to some embodiments, the core also provides a displacement within the volume of tank 11 whereby the amount of volume within the tank 11 to be filled with the mixture is decreased by the amount consumed by the core. Such displacement may have certain benefits, such as by limiting the volume of mixture in the tank, the mixture will change temperature more quickly (because of the decreased volume in the tank as well as the increased surface area of the tank and/or core for heat exchange), and further has a lower residence time in the tank 11 to avoid over-mixing. In the example of the manufacture of ice cream, such displacement may have the benefits of limiting the formation of ice crystals due to faster freezing, resulting in a smoother texture and consistency of the ice cream, and limiting the residence time in the tank, which limits buttering due to over-mixing.

Further, as discussed herein, the ability of the mixing device 10 to generate large amounts of turbulence and mixing forces may be even further increased by the core 38 remaining stationary, which increases friction and shear forces within the medium being mixed as between the rotating frame 14 and the stationary core 38 (and tank 11).

Preferably, the core 38 does remain stationary along with the tank 11, such that only the rotating frame 14 is moving. This minimizes moving parts which may further improve the reliability of the system.

Figure 4:
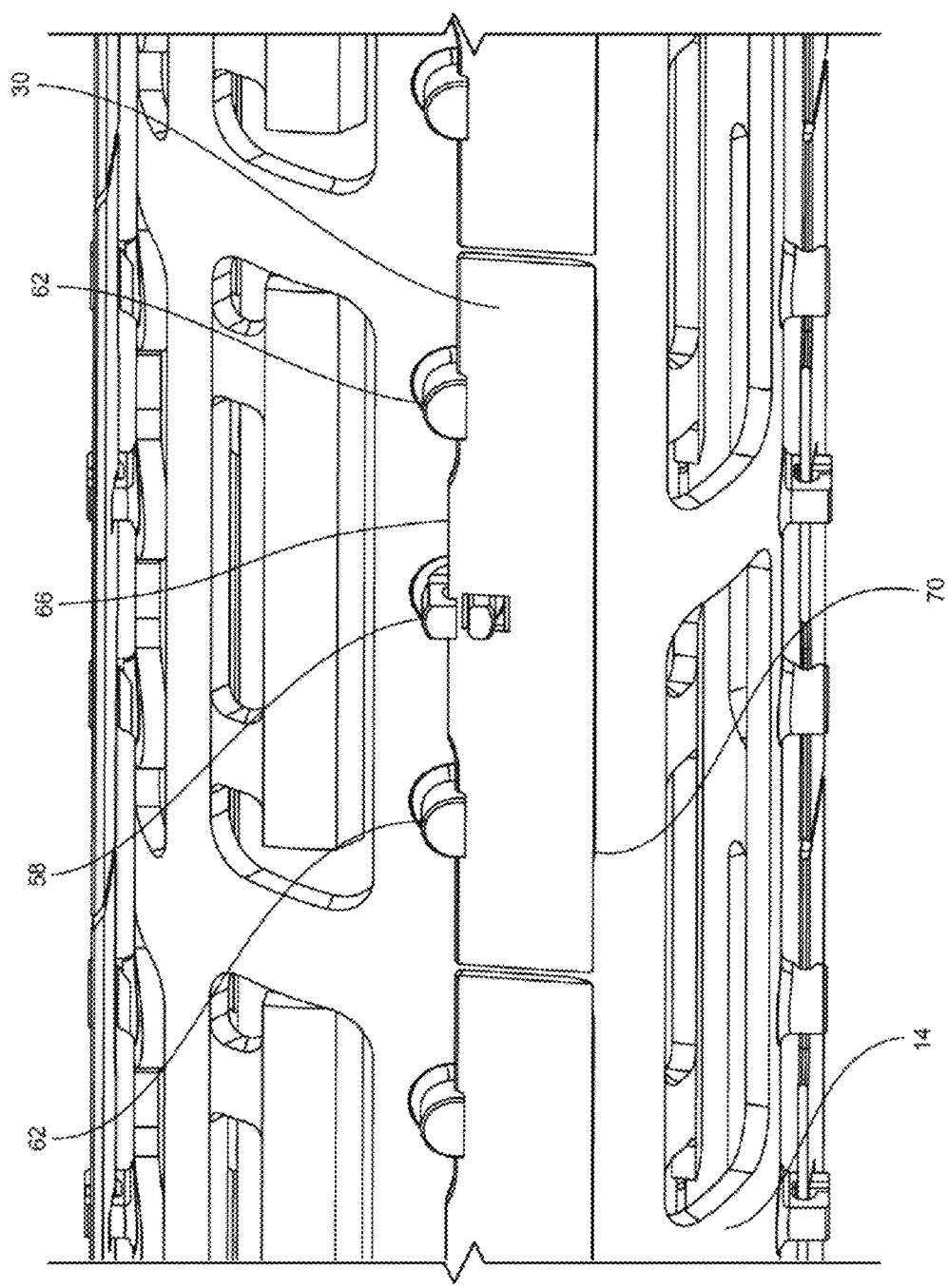
FIG. 4 is a close view of a blade of the dasher.

Attachment of one of the knives 30 according to the illustrated embodiment is shown in FIG. 4. The knife 30 is attached to the frame 14 by a center attachment 58 and two lateral attachments 62. The lateral attachments 62 provide support in the direction of rotation D, that is, to maintain a free edge 70 of knife 30 in a leading position, while the central attachment pivotally fixes the knife 30 to the frame 14. The knife 30 is therefore fixed at an attached edge 66 to a certain circumferential and axial position on the frame 14, but can pivot such that its free edge 70 can move radially toward or away from the frame 14. When the dasher 12 is rotated in a filled tank 11, resistance from the mixture causes the free edge 70 to travel radially outward until it scrapes along an interior surface of the tank 11. Alternatively or additionally, the knives 30 may be biased outwards, away from frame 14, to provide additional force to ensure knives 30 scrape the mixture off of the inner wall of tank 11 to minimize loss of mixture, to provide improved consistency throughout the mixture in the tank 11, and the like. The knives 30 thereby dynamically adjust to the size of the tank 11 and any irregularities in the interior surface of the tank 11 so as to scrape a maximum amount of mixture from the interior surface. As such, the knives 30 are the only parts of the dasher 12 according to the illustrated embodiment that may move relative to the frame 14 during intended operation. While this is beneficial in many aspects for the mixing device 10 during operation, in certain embodiments, the dynamic adjustment of the knives 30 may allow for a simpler retrofitting process where the dasher 12 can be retrofitted into an existing system, which may or may not include an existing tank 11 into which the dasher 12 can be positioned.

During use, the knives 30 and deflectors 34, and associated first and second gaps 22 and 26, cooperate to effect continuous mixture within the apparatus 10. Continuing with the above embodiment in FIG. 3 for purposes of illustration, the circumferential and radially outward extension of the knives 30 from the frame 14 creates an inward flow 50 of a mixture when the dasher 12 is rotated in the direction of rotation D in a filled tank 11. The inward flow 50 brings mixture from outside the frame 14, in secondary cavity 43, into the cavity 42. Similarly, the circumferential and radially inward extension of the deflectors 34 into the cavity 42 creates an outward flow 54 of the mixture when the dasher is rotated in the direction of rotation D in the filled tank 11. As such, rotation of the dasher 12 continuously drives the mixture into and out of the cavity 42, and respectively out of and into secondary cavity 43, thereby agitating and mixing the mixture.

Figure 5:
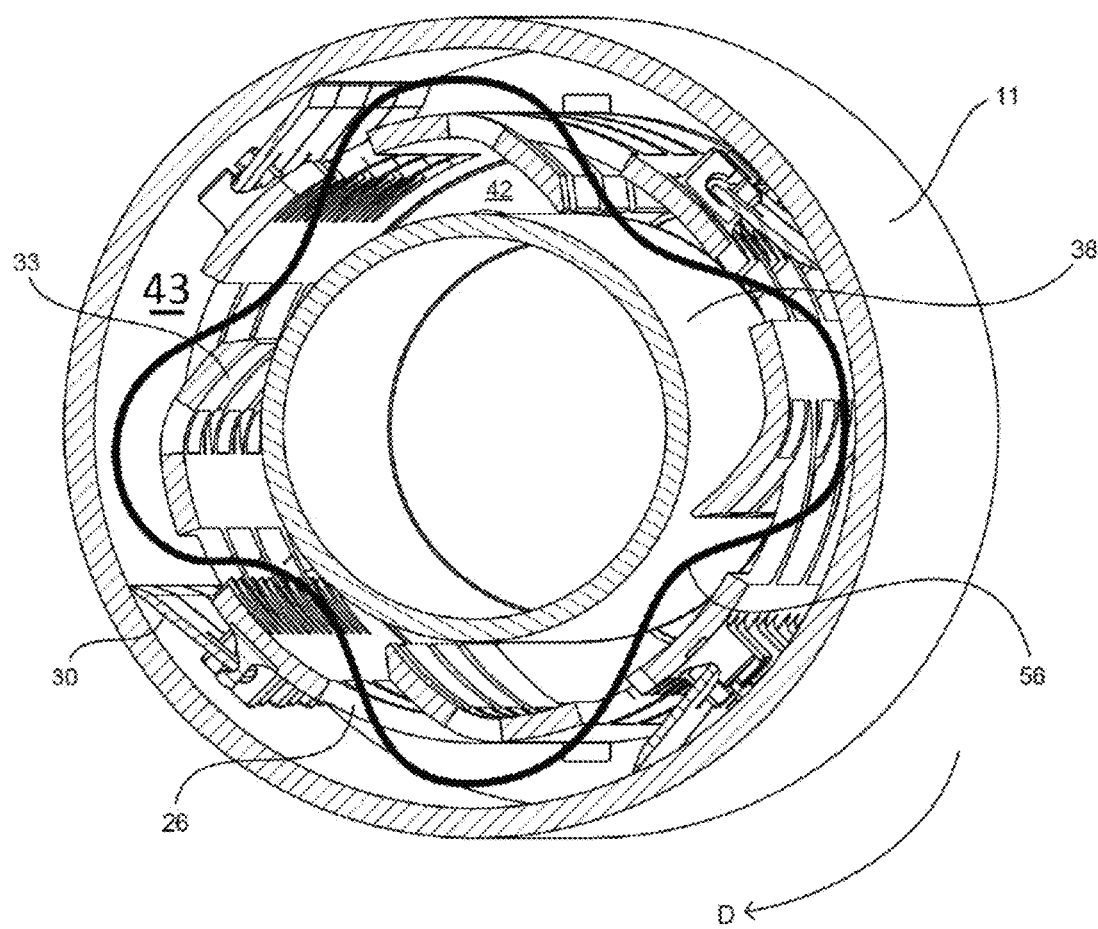
FIG. 5 is a cross-sectional view of a dasher according to an embodiment of the present disclosure illustrating a representative fluid flow within the dasher.
Figure 6:
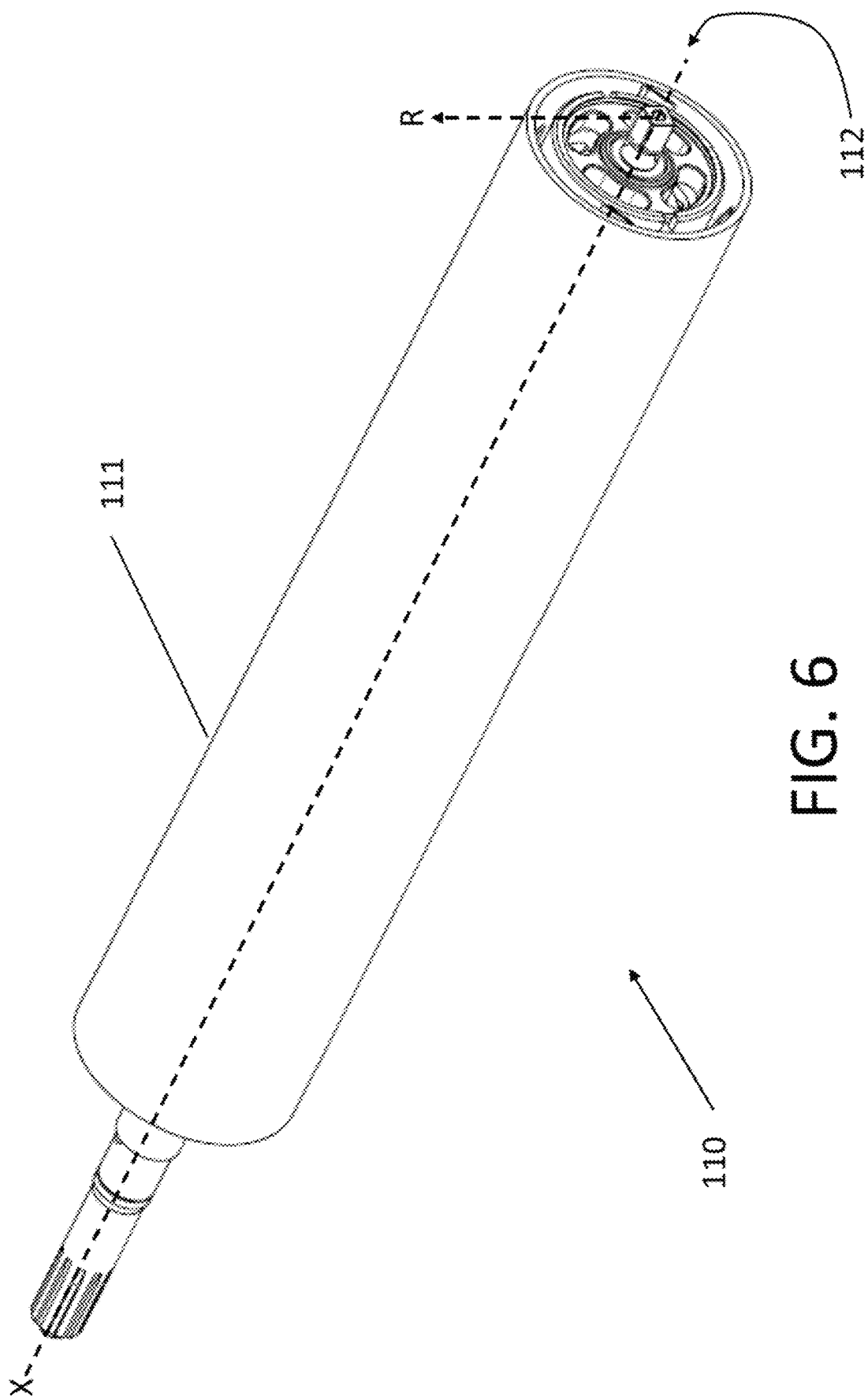
FIG. 6 is a perspective view of a mixing apparatus according to another embodiment of the present disclosure.

A similar flow pattern according to an embodiment with a clockwise direction of rotation D is depicted as a continuous flow 56 in FIG. 5. As described above with regard to FIG. 3, the knives 30 and deflectors 34 cooperate to drive the continuous flow 56 of the mixture into the cavity 42 through the first gaps 22 and out of the cavity 42 through the second gaps 26. Of course, while rotation is illustrated in a clockwise direction, the dasher could be set up in the reverse and operated instead in a counterclockwise direction. The dasher can thus be configured to run in a clockwise or counterclockwise direction as desired.

It should be understood that the flow patterns depicted in FIGS. 3 and 5 only represent flow along a single plane or cross-section of the mixing device 10. According to some embodiments, the mixture is fed in at a first end of the tank 11 and exits at a second end of the tank 11. Feeding the mixture generates an axial movement of the mixture from the first end to the second end, in addition to the circumferential/tortuous flow pattern depicted in FIGS. 3 and 5.

FIGS. 6-10 illustrate a mixing apparatus 110 according to another embodiment. The mixing apparatus 110 of FIGS. 6-10 is generally similar to the apparatus 10 of FIGS. 1-5, and as such like references numbers denote similar structures, except for certain differences described below and shown in the figures. The apparatus 110 includes a cylindrical or generally cylindrical freezing tank 111 extending along an axis X. A radial direction R is defined perpendicular to the axis X. An elongate dasher 112 is disposed concentrically within the tank 111 along the axis X. As the tank 111 and dasher 120 are positioned concentrically, the axis X is also an axis of rotation for the dasher 112.

Figure 7:
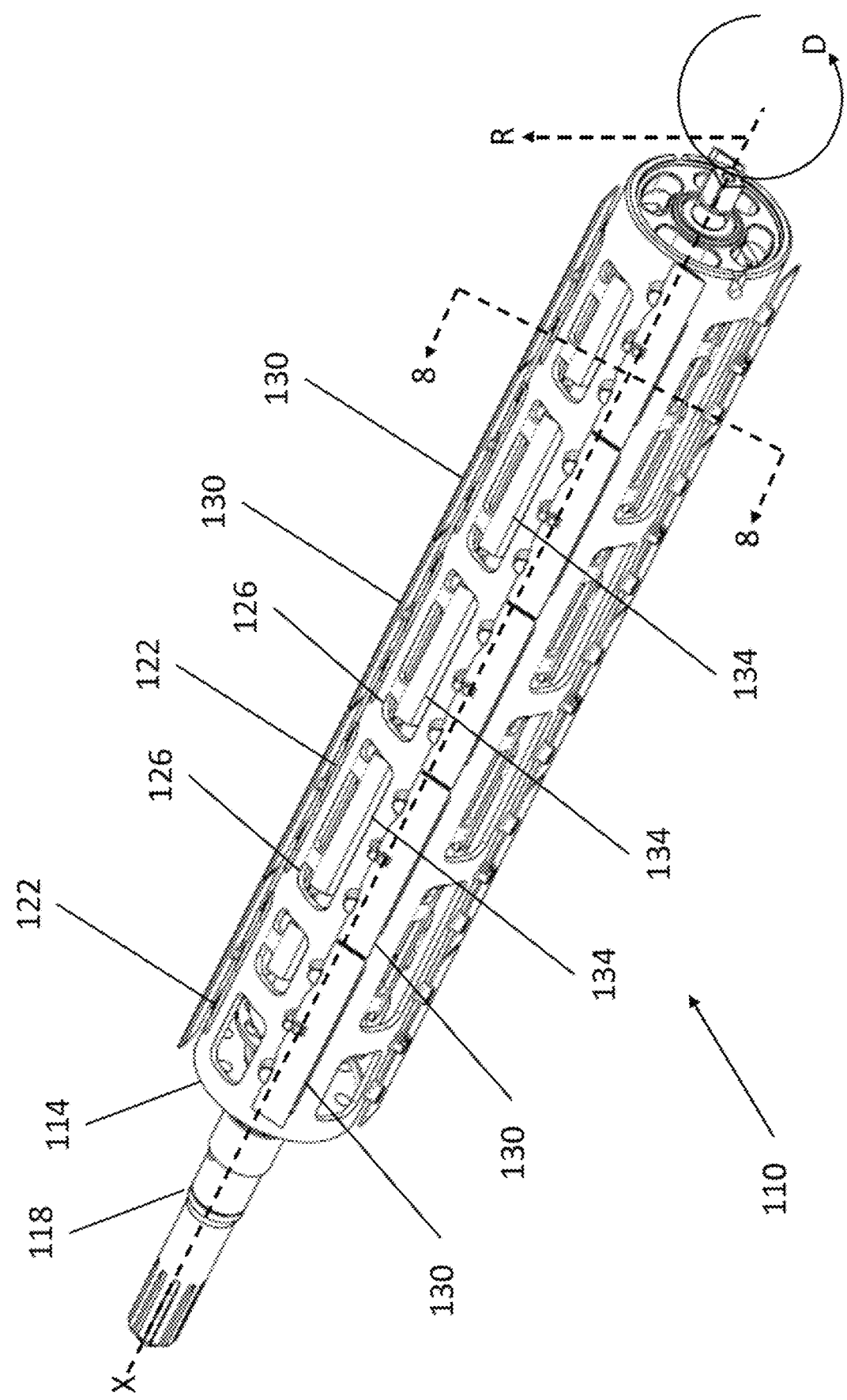
FIG. 7 is a perspective view of a dasher in the mixing apparatus.

FIG. 7 illustrates the dasher 112 in greater detail. The dasher 112 has a cylindrical or generally cylindrical frame 114 that extends along the axis X. A drive shaft 118 operatively connected to the frame 114 serves to enable the dasher to be driven by, for example, a motor in a direction of rotation D.

The frame 114 according to the illustrated embodiment includes circumferentially alternating rows of first gaps 122 and second gaps 126 that extend axially along the frame. According to the illustrated embodiment, the first gaps 122 are entry gaps and the second gaps 126 are exit gaps for agitated mixture. Mixture herein will be used to refer generally to any materials processed by the mixing apparatus 110, including those ingredients, mixtures, and gases discussed above as to mixing apparatus 10.

Knives 130 extend radially outward from the frame 114 and circumferentially in the direction of rotation D to interact with first gaps 122. As illustrated, the knives 130 may at least partially overlap the first gaps 122. Similarly, deflectors 134 extend radially inward from the frame 14 and circumferentially in the direction of rotation D to interact with second gaps 126. As illustrated, the deflectors 134 may at least partially overlap the second gaps 126. The knives 130 and deflectors 134 are arranged in circumferentially alternating rows in the illustrated embodiment, but other embodiments with differing arrangements are contemplated. For example, embodiments wherein the knives 130 and deflectors 134 alternate axially within a row, or wherein both a knife 130 and a deflector 134 extend over a single gap 122 and/or 126 are contemplated.

According to some embodiments, the deflectors 134 are of a unitary piece with the frame 114. Manufacturing a dasher 112 according to such embodiments may include, for example, producing a cylinder corresponding to the frame 114 and cutting openings in the cylinder, wherein each of the openings provides one of the second gaps 126 and a blank for one of the deflectors 134. Each resulting blank is then pressed or drawn radially inward to produce the deflectors 134 as illustrated. Such a manufacturing method enables the frame 114 and deflectors 134 to be manufactured from a single piece of material (e.g., as a monolithic structure) which may provide various benefits such as increased strength, since the entire structure is a single piece there are no connections between pieces which could flex or cause movement, and reliability, in that the lack of connections between pieces minimizes weak points which could break.

Figure 8:
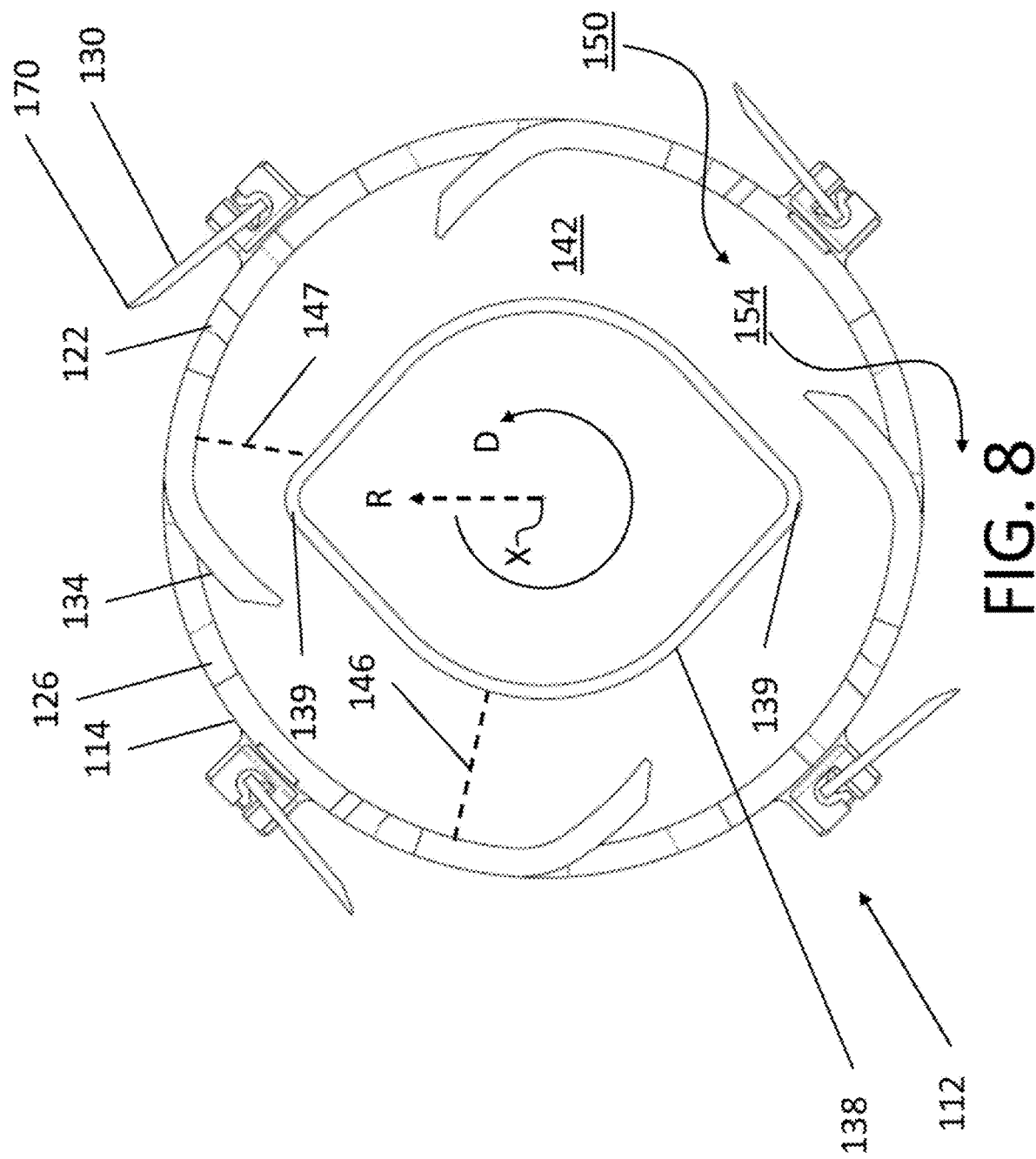
FIG. 8 is a view along section 8-8 of FIG. 7.
Figure 9:
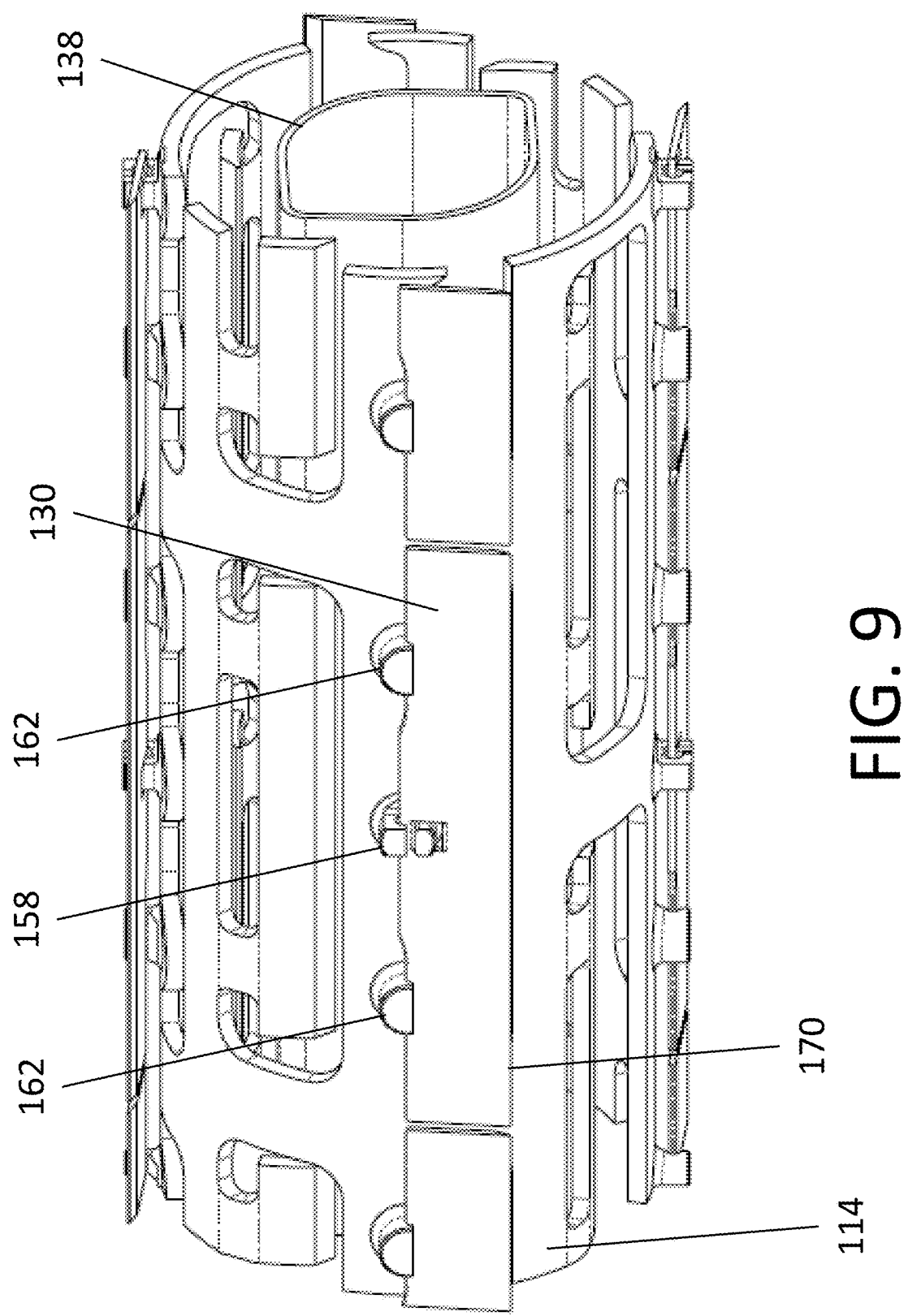
FIG. 9 is a close view of a blade of the dasher.

The relationship of these features relating to this particular embodiment are further illustrated in FIG. 9, which illustrates the dasher 112 and a core 138 extending along the axis X concentrically within the frame 114. The core 138 according the example illustrated in FIG. 8 is football or lemon-shaped in axial cross-section along most or all of its length, though a core with an oblong or oval cross-sectional shape could achieve some of the same effects described herein. Other shapes of the core may include obround shapes, polygonal shapes (e.g., triangular, diamond, pentagonal, hexagonal, etc.), star-shapes, a randomized geometrical shape, or the like, in axial cross-section along most or all of its length. The cross-sectional shape of the core may also vary along its length between one or more of these shapes, or even between one or more of these shapes and a circular cylindrical shape. More complex shapes formed by a multiplicity of faces are also contemplated. For example, the cross-sectional shape could include regular or irregular polygons, either of which may be convex or concave polygons, having on the order of 100 or more discrete sides. For example, the perimeter of the cross-sectional shape could be defined by a hoop of points or pyramids. The cross-sectional shape may also vary along the length of the core 138 so as to create an uneven surface contour, which may be repeating or irregular. The shape of the core 138 may be selected to complement the fluid characteristics of the substances being mixed so that the core 138 facilitates better turbulence and flow profiles within the apparatus 110. While any of these shapes are possible and useful, shapes with smooth, continuous surfaces may provide the most efficiency and benefit to the apparatus 110. Namely, the illustrated football or lemon-shape of core 138 may be a preferred shape in that it provides increased turbulence in the mixture, because of its non-circular shape, and a decreased likelihood of having mixture adhere to the surface of the core, because of its continuously curved shape (particularly, a shape with a surface area having a continuously convex shape as illustrated by core 138 in FIGS. 8-9). Similar shapes could include a triangular or other polygonal shape with rounded corners and same or varying length surfaces extending in between corners. This is relative to, for example, a polygonal-shaped core or even a linear, rectangular bar or the like, which may similarly increase turbulence though could have the risk of creating very abrupt turbulence at the corners of such a core which may not be preferred depending on the mixture being mixed in apparatus 110. In still other examples, a core with an S-shape or "paddlewheel"-type shape, which may have one or more convexities and one or more concavities are also envisioned.

Similar to apparatus 10 and core 38, core 138, despite its non-circular shape, remains co-axial with dasher 112 and tank 111, and further does not itself rotate, and thus apparatus 110 enjoys increased efficiency and reliability, with fewer moving parts. Further, its co-axial position, as discussed above as to apparatus 10, still maintains generally even balance and weight distribution despite the non-circular shape of the core. The primary difference, and benefit, of core 138 is the irregular shape which allows for increased turbulence and mixing capability within the apparatus 110 as it interacts with the features of dasher 112.

The cavity 142 is thus defined between a radially inner surface of the frame 114 and a radially outer surface of the core 138, while a secondary cavity 143 is defined between the outer surface of frame 114 and the inner surface of tank 111. Because of the non-circular cross-sectional shape of the core 138, the cavity 142 is also a non-circular cylindrical in shape. Stated another way, a first radial spacing 146 between the radially inner surface of the frame 114 and the radially outer surface of the core 138 at a first location may differ from a second radial spacing 147 along a majority or entirety of a length of the dasher 112. The radial spacing between any point on the frame 114 and the dasher 138 will oscillate up and down as the frame 114 rotates about the core 138, producing a different flow pattern than the above described device 10 of FIGS. 1-5.

Attachment of one of the knives 130 according to the illustrated embodiment is shown in FIG. 4. The knife 130 is attached to the frame 114 by a center attachment 158 and two lateral attachments 162. The lateral attachments 162 provide support in the direction of rotation D, that is, to maintain a free edge 170 of the knife 130 in a leading position, while the central attachment pivotally fixes the knife 30 to the frame 114. The knife 130 is therefore fixed at an attached edge 166 to a certain circumferential and axial position on the frame 114, but can pivot such that its free edge 170 can move radially toward or away from the frame 114. When the dasher 112 is rotated in a filled tank 111, resistance from the mixture causes the free edge 70 to travel radially outward until it scrapes along an interior surface of the tank 111. Alternatively or additionally, the knives 130 may be biased outwards, away from frame 114, to provide additional force to ensure knives 130 scrape the mixture off of the inner wall of tank 111 to minimize loss of mixture, to provide improved consistency throughout the mixture in the tank 111, and the like. The knives 130 thereby dynamically adjust to the size of the tank 111 and any irregularities in the interior surface of the tank 111 so as to scrape a maximum amount of mixture from the interior surface. As such, the knives 130 are the only parts of the dasher 112 according to the illustrated embodiment that may move relative to the frame 114 during intended operation. While this is beneficial in many aspects for the mixing device 110 during operation, in certain embodiments, the dynamic adjustment of the knives 130 may allow for a simpler retrofitting process where the dasher 112 can be retrofitted into an existing system, which may or may not include an existing tank 111 into which the dasher 112 can be positioned.

During use, the knives 130 and deflectors 134, and the associated first and second gaps 122 and 126, cooperate to effect continuous mixture within the apparatus 110. Continuing with the above embodiment in FIG. 8 for purposes of illustration, the circumferential and radially outward extension of the knives 130 from the frame 114 creates an inward flow 150 of a mixture when the dasher 112 is rotated in the direction of rotation D in a filled tank 111. The inward flow 150 brings mixture from outside the frame 114, in secondary cavity 143, into the cavity 142. Similarly, the circumferential and radially inward extension of the deflectors 134 into the cavity 142 creates an outward flow 154 of the mixture when the dasher is rotated in the direction of rotation D in the filled tank 111. As such, rotation of the dasher 112 continuously drives the mixture into and out of the cavity 142, and respectively out of and into secondary cavity 143, thereby agitating and mixing the mixture.

The non-circular shape of the core 138 contributes to mixing of the contents of the tank 111 by encouraging different portions of the mixture to travel radially inward and radially outward. The core 138 may be sized such that the deflectors 134 never contact the core 138. However, every time a deflector 134 passes a pole 139, the deflector 134 will knock any accumulated components of the mixture off of the pole 139. As the deflector 134 moves away from the pole 139, any mixture components caught on the front of the deflector 134 will either travel up the surface of the deflector and radially outward or will fall radially inward toward the core 138. The non-circular cylindrical shape of the core 138 therefore prevents accumulation of unmixed materials on the front of the deflector 134.

Figure 10:
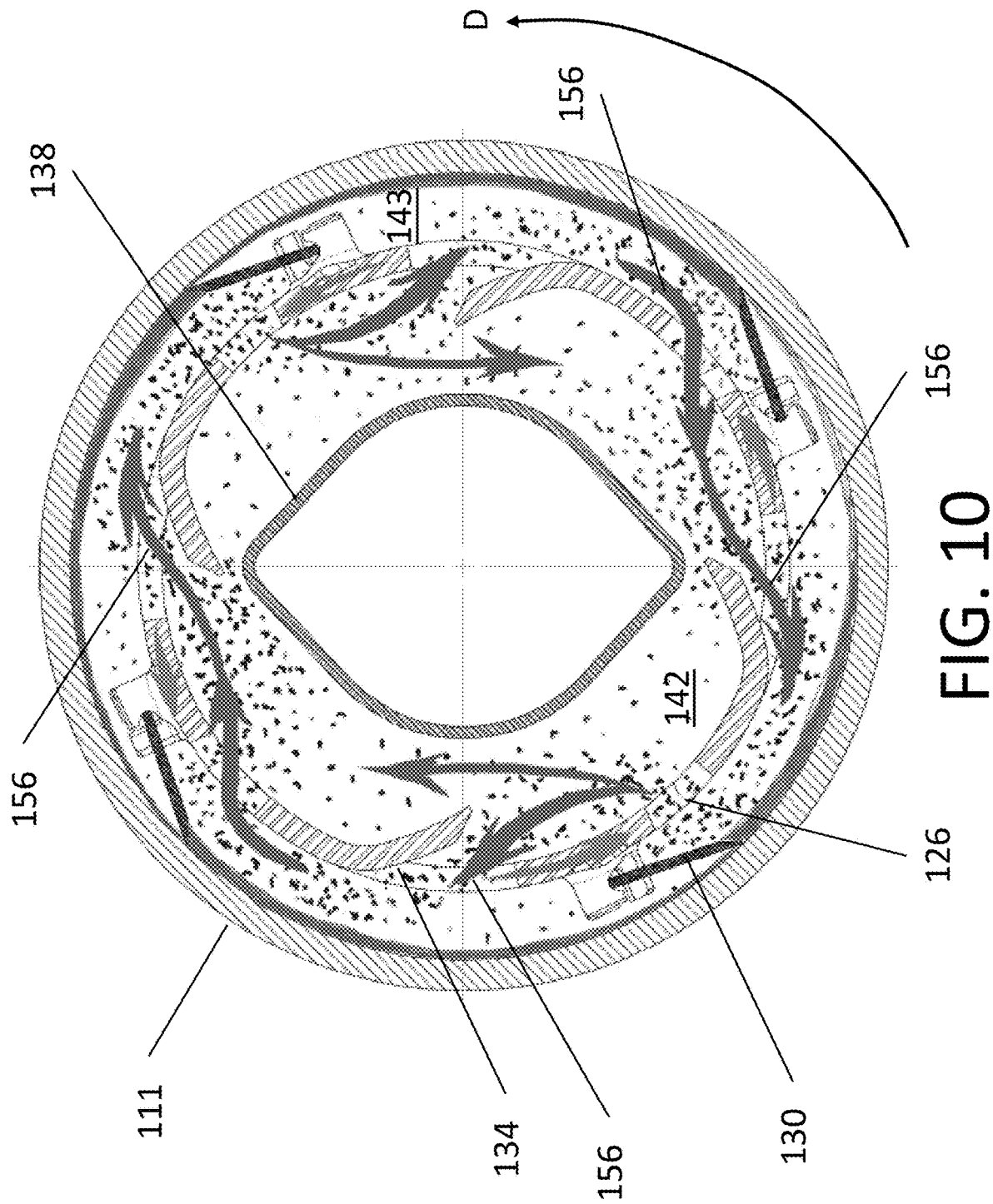
FIG. 10 is a cross-sectional view of the dasher of FIG. 6 illustrating a representative fluid flow within the dasher.

The resulting flow pattern according is depicted by flow arrows 156 in FIG. 10. As described above with regard to FIG. 8, the knives 130 and deflectors 134 cooperate to drive the continuous flow 156 of the mixture into the cavity 142 through the first gaps 122 and out of the cavity 142 through the second gaps 126. Of course, while rotation is illustrated in a counter-clockwise direction, the dasher could be set up in the reverse and operated instead in a clockwise direction. The dasher can thus be configured to run in a clockwise or counterclockwise direction as desired.

It should be understood that the flow patterns depicted in FIGS. 8 and 10 only represent flow along a single plane or cross-section of the mixing device 110. According to some embodiments, the mixture is fed in at a first end of the tank 111 and exits at a second end of the tank 111. Feeding the mixture generates an axial movement of the mixture from the first end to the second end, in addition to the circumferential/tortuous flow pattern depicted in FIGS. 8 and 10. The axial movement of the mixture can be manipulated further by altering the shape of the core 138 along the direction of axis X. For example, the core 138 may change in shape along the axis X to have discrete axial ramps and vales or to otherwise have geometry that pushes axially travelling mixture components radially away so that the components do not simply travel along the surface of the core 138. The variations in the shape of the core 138 may be aligned along the axis X with certain features of the frame 114. For example, the core 138 may have a different shape at the axial location of a deflector 134 than at axial locations between the deflectors 134.

Compared to some known mixing equipment, the dashers 12, 112 described herein provide more thorough and consistent mixing of the mixture. According to certain embodiments, the deflectors 34, 134 may be sized relative to a radial dimension of the cavity 42, 142 to reduce or eliminate dead zones and "coring," meaning caking of mixture on the core 38, 138. This is particularly reduced when using a core having a non-circular cylindrical shape, such as that illustrated as core 138, and deflectors 134 are sized, as discussed above, such that they may not contact core 138 along any surface of core 138, though such contact between the structures may be designed should the particular situation warrant it. The reduction of dead zones is also accomplished in part by the greater turbulence generated by the deflectors 34, 134 relative to some known devices. In certain applications, the additional turbulence can provide improved mixture of ingredients. For example, the additional turbulence can improve the efficiency with which gas is mixed into ingredients for ice cream, thereby benefitting production time and texture in the finished product.

This agitation and mixing can occur in any cycle or manner desired, for example, it can occur in a continuous manner, by constant rotation of dasher 12, 112, or in an intermittent manner, by performing a cycle of starting and stopping the dasher at intermittent intervals. Depending on the type of mixture in the apparatus 10, 110, the type of texture or consistency desired, or other such variables, the apparatus 10, 110 may be operated in any manner desired. Furthermore, the speed (i.e., the revolutions per minute, or rpm) at which the dasher rotates can be adjusted dependent upon similar such variables, and such speed of the dasher can be adjusted prior to initiation of the manufacturing process or on the fly at any time during the manufacturing process. Still further, the dasher 12, 112 may be rotated in the direction opposite to direction D, which may be useful in situations where the dasher may be clogged, for example.

An exemplary mixture to be mixed and turned into a semi-frozen consistency in the mixing apparatus 10, 110 is a mixture of ingredients for ice cream. An exemplary mixture of ingredients for ice cream includes at least a dairy component and optionally a flavor component. To these ingredients is added an amount of gas, typically compressed air, which causes increased overrun (defined as the amount of gas pushed into the mixture) in the ice cream, which can be particularly useful in manufacturing low fat ice cream products, which include minimal fats and thus a thinner dairy component, to nevertheless develop a creamy and smooth textured product.

The mixture may be prepared prior to being filled into the tank 11, 111, meaning the dairy component and the optional flavor component would be introduced to the tank 11, 111 simultaneously. Further, an amount of gas, such as compressed air, may be introduced into the mixture prior to the tank 11, 111 being filled with the mixture. The gas and mixture may then be introduced to the tank 11, 111 simultaneously. Alternatively, any or all of the dairy component, the optional flavor component, and the gas may be kept separate and added to the tank 11, 111 independently from the other elements to be added to the tank. Regardless, rotating the dasher 12, 112 after adding the dairy component, the optional flavor component, and the gas to the tank 11, 111 mixes the substances in the tank 11, 111 to create the ice cream product.

Though the foregoing description generally relates to production of ice cream, the mixing devices 10, 110 of the present disclosure are suitable for a variety of applications. The mixing devices 10, 110 are suitable for continuous agitation of products as, for example, coffee beans (e.g., roasting, or other processing, of coffee beans or brewing coffee liquor, such as for freeze dried coffee), grains or cereals (e.g., roasting, cracking, or other processing of grains at various production stages), tomato paste, and for processing various products including hand creams, sorbets, and beverages (whether frozen or all-liquid), any of which may benefit from increased turbulence, which in the presence of a gas such as compressed air, can result in a higher overrun. Further, though the foregoing description explains agitating a product while it freezes, the mixing devices 10, 110 could instead be used to agitate a product while it is being heated, temperature regulated, roasted, or the like. In another example, the mixing devices 10, 110 could be used within a scraped surface heat exchanger.

As discussed above, the mixing device 110, including a non-circular core 138, may provide additional benefits to the mixing process. Namely, the non-circular or irregular shape of the core 138 may impart additional agitation to the mixture within cavity 142, and between cavity 142 and secondary cavity 143, such as is illustrated in FIG. 10 for example. The irregular shape of core 138 may prevent mixture from accumulating on or adjacent to the core, resulting in a higher likelihood of uniform mixing throughout the mixture in cavity 142/secondary cavity 143. The irregular shape of the core 138 inhibits the development of smooth flow paths through the tank 111 along which portions of the mixture components might travel without breaking apart or mixing together with other portions and components because the shape of the space available to the mixture components will change along with the rotational position of the frame 114 about the core 138. The absence of smooth, continuous flow paths will break apart clumps of mixture components and thereby contribute to uniform mixing. Uniform mixing is important to the resulting product, particularly where this device 110 is being used to mix ice cream and other frozen products which rely on a uniform mixture of ingredients and gas to attain the proper consistency and texture throughout the product.

Furthermore, in other embodiments, rather than a single inflow into and a single outflow out of the mixing device, more than one inflow and/or outflow may be incorporated into the mixing device, and such inflow(s) and outflow(s) may be positioned anywhere along the length of the mixing device 10, 110 desired. Further, the actual opening into the tank volume for any of these inflow(s) and outflow(s) could be anywhere desired, such as on the end surfaces of the mixing device, on the outer cylindrical surface of the tank, or even through the core 38, 138 (e.g., through one more holes in the core, including in some instances a core that is perforated with one or more holes at one location on the length or along at least a portion of the length, or along the entirety or substantially the entirety of the length). Similarly, any of the inflow openings discussed above could be dedicated to one of the mixture or the gas, or any combination thereof. In furtherance of uniform mixing, either core 38, 138 may optionally be rotated about axis X during operation of device 10, 110. The optional rotation of core 38, 138 can be either in the same direction as or in an opposite direction of rotation of the corresponding frame 10, 110. Optionally, tank 11, 111 may be rotated about axis X additionally or instead of either or both of core 38, 138 in either a clockwise or counterclockwise direction.

Although the concepts herein have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A device for manufacturing a frozen edible product, comprising:
   a cylindrical tank;
   a non-circular cylindrical core extending along a central axis of the cylindrical tank, wherein the non-circular cylindrical core defines an oblong axial cross-section; and
   a dasher disposed within the cylindrical tank and about the non-circular cylindrical core and configured to rotate in a direction of rotation on an axis of rotation, the dasher comprising:
      a cylindrical frame concentric with the cylindrical tank and having at least one first gap;
      at least one deflector extending from the at least one first gap, each of the at least one deflector extending radially inward relative to the axis of rotation and circumferentially in the direction of rotation; and
      at least one blade extending radially outward from the dasher.

2. The device of claim 1, wherein the frozen edible product is a frozen dairy product.

3. The device of claim 1, wherein:
   the at least one deflector is a plurality of deflectors, the plurality of deflectors are arranged in axially extending rows of deflectors;
   the at least one blade is a plurality of blades, the plurality of blades are arranged in axially extending rows of blades; and the rows of deflectors and rows of blades are arranged in an alternating pattern around a circumference of the dasher.

4. The device of claim 3, wherein the alternating pattern is symmetrical such that the dasher has a balanced distribution of mass relative to the axis of rotation.

5. The device of claim 1, the dasher further comprising a plurality of second gaps and the at least one blade is a plurality of blades, wherein the plurality of blades extend in the direction of rotation at least partially overlapping the second gaps.

6. The device of claim 1, wherein the oblong axial cross section of the non-circular cylindrical core has a lemon-shaped axial cross-section.

7. The device of claim 6, wherein the at least one deflector is a plurality of deflectors, the plurality of deflectors extend radially inward into a non-circular cylindrical cavity defined between a radially inner surface of the frame and a radially outer surface of the non-circular cylindrical core.

8. The device of claim 7, wherein the cylindrical tank, the cylindrical frame, the non-circular cylindrical core and the cavity of the dasher are all arranged concentrically around the axis of rotation.

9. A dasher assembly for manufacturing a frozen edible product, comprising:
a cylindrical frame extending along the axis of rotation, the cylindrical frame including a plurality of first gaps in the cylindrical frame and a plurality of deflectors;
a non-circular cylindrical core extending within the cylindrical frame along an axis of rotation, wherein the non-circular cylindrical core has an oblong shape; and
a cavity defined between a radially inner surface of the cylindrical frame and a radially outer surface of the non-circular cylindrical core, each of the plurality of deflector extends radially inward and circumferentially in the direction of rotation from a respective one of the plurality of first gaps in the cylindrical frame into the cavity,
wherein the cylindrical frame and the non-circular cylindrical core have a balanced distribution of mass relative to the axis of rotation along a majority of a length of the cylindrical frame.

10. The dasher assembly of claim 9, wherein the frozen edible product is a frozen dairy product.

11. The dasher assembly of claim 9, further comprising blades extending radially outward from the cylindrical frame, wherein:
the plurality of deflectors are arranged in axially extending rows of deflectors;
the blades are arranged in axially extending rows of blades; and
the rows of deflectors and rows of blades are arranged in an alternating pattern around a circumference of the dasher.

12. The dasher of claim 9, wherein the cylindrical frame and the non-circular cylindrical core have a lemon-shaped axial cross-section.

13. A method for manufacturing a frozen dairy product, comprising:
filling a device for manufacturing the frozen dairy product with an amount of dairy product mixture, the device comprising a cylindrical tank and a dasher positioned within the cylindrical tank and configured to rotate in a direction of rotation on an axis of rotation about a non-circular cylindrical core that extends along the axis of rotation and defines an oblong axial cross-section, the dasher comprising a generally cylindrical frame concentric with the cylindrical tank and having a plurality of first gaps, and deflectors extending from the plurality of first gaps, each of the deflectors extending radially inward relative to the axis of rotation and circumferentially in the direction of rotation; and
rotating the dasher in the direction of rotation on the axis of rotation about the non-circular cylindrical core.

14. The method of claim 13, wherein the dasher further comprises a plurality of blades and a plurality of second gaps, each blade of the plurality of blades extending radially outward from the cylindrical frame and at least partially overlapping a respective one of the plurality of second gaps, wherein during the rotating step the blades direct a mixture into the cylindrical frame through the plurality of second gaps, and the deflectors direct the mixture out of the cylindrical frame through the plurality of first gaps.

15. The method of claim 13, wherein the oblong axial cross-section of the non-circular cylindrical core has a lemon-shaped axial cross-section along most or all of its length.

16. The method of claim 13, further comprising the step of preparing the dairy product mixture prior to the filling step, wherein the filling step includes introducing the prepared dairy product mixture.

17. The method of claim 16, wherein an amount of compressed gas is introduced to the dairy product mixture prior to the filling step, wherein the filling step includes introducing the prepared dairy product mixture and compressed gas simultaneously.

18. The method of claim 13, wherein the dairy product mixture comprises at least a dairy component and optionally a flavor component, wherein the filling step includes independently adding to the device the dairy component, the optional flavor component, and compressed gas, wherein the rotating step includes mixing the dairy component, optional flavor component, and compressed gas to create the dairy product mixture.

19. The method of claim 13, wherein the rotating step continues until the dairy product mixture is mixed and cooled into a semi-frozen dairy product.

20. The method of claim 19, further comprising the step of moving the semi-frozen dairy product from the device into a freezer to form the frozen dairy product.

* * * * *